United States Patent Office 3,244,308
Patented Apr. 5, 1966

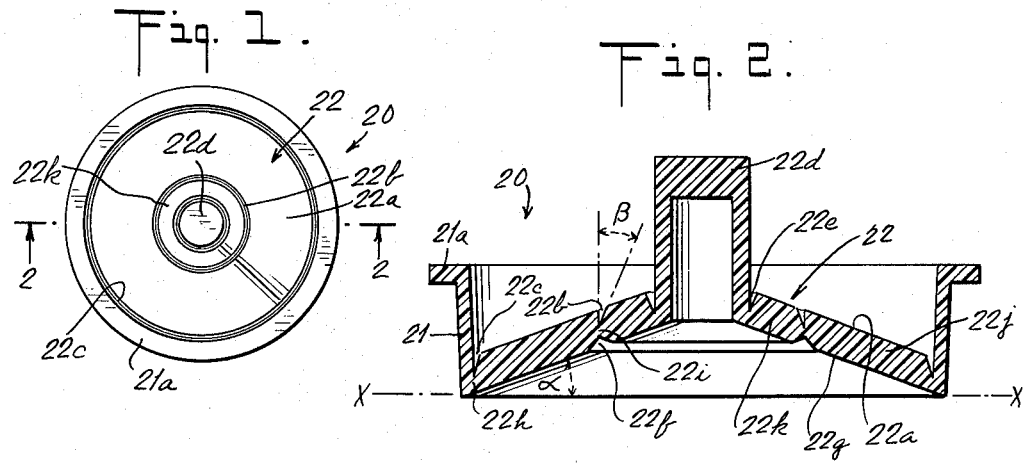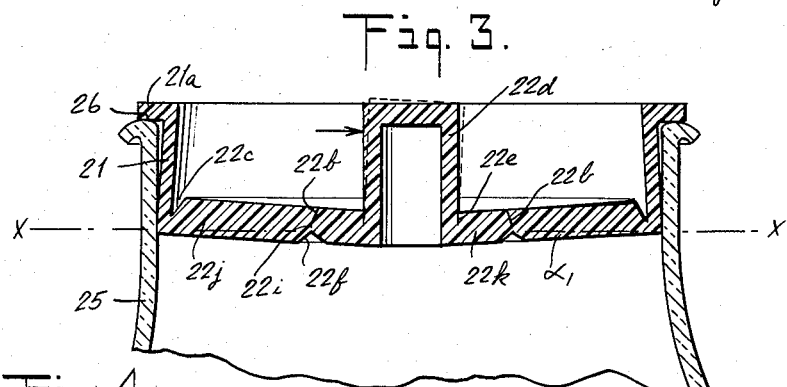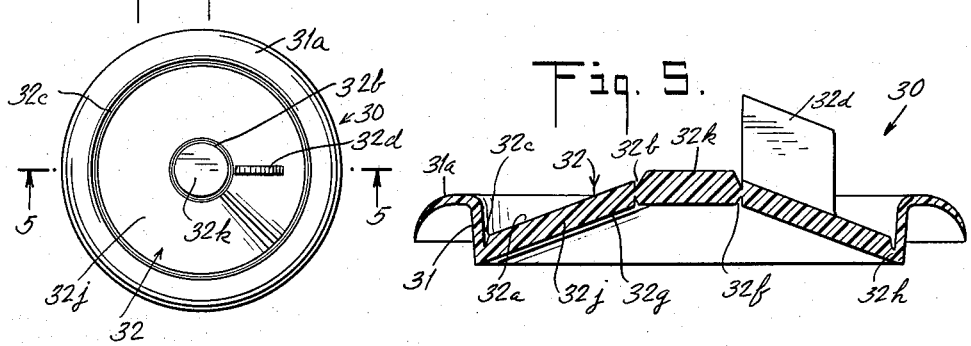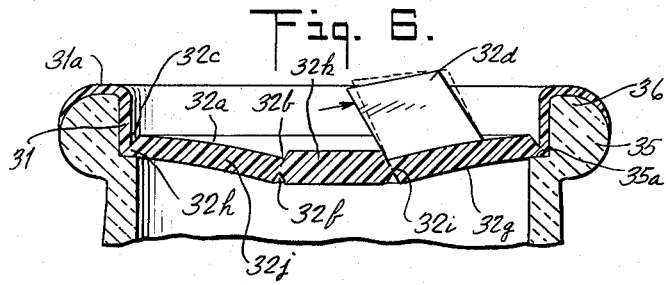
INVENTOR.
VINCENT J. ESPOSITO, JR.
BY
Barnett + Barnett
ATTORNEYS

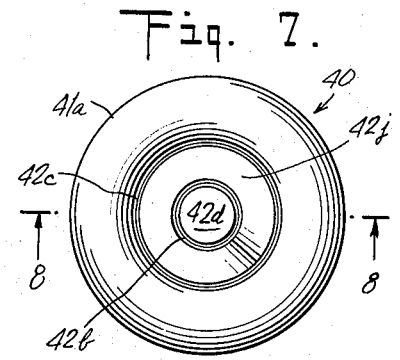
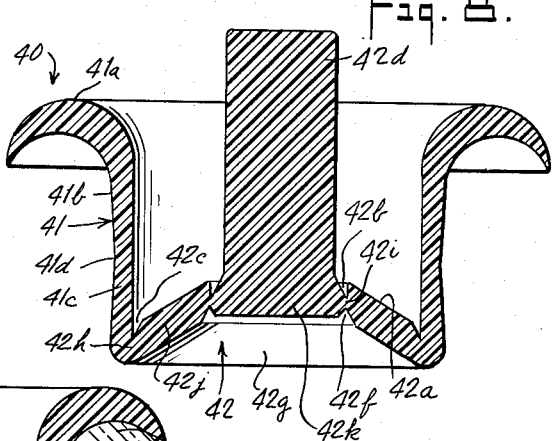
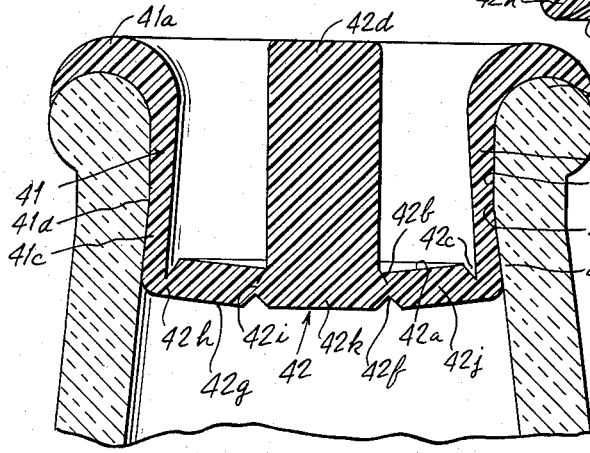
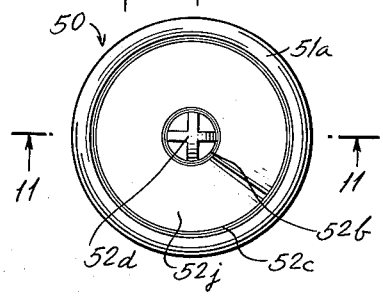
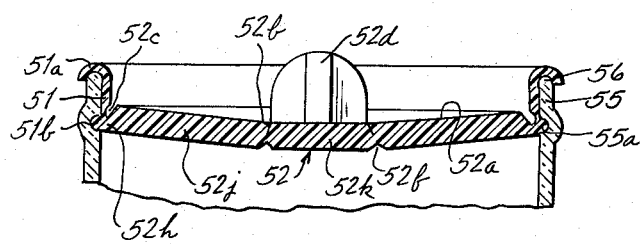

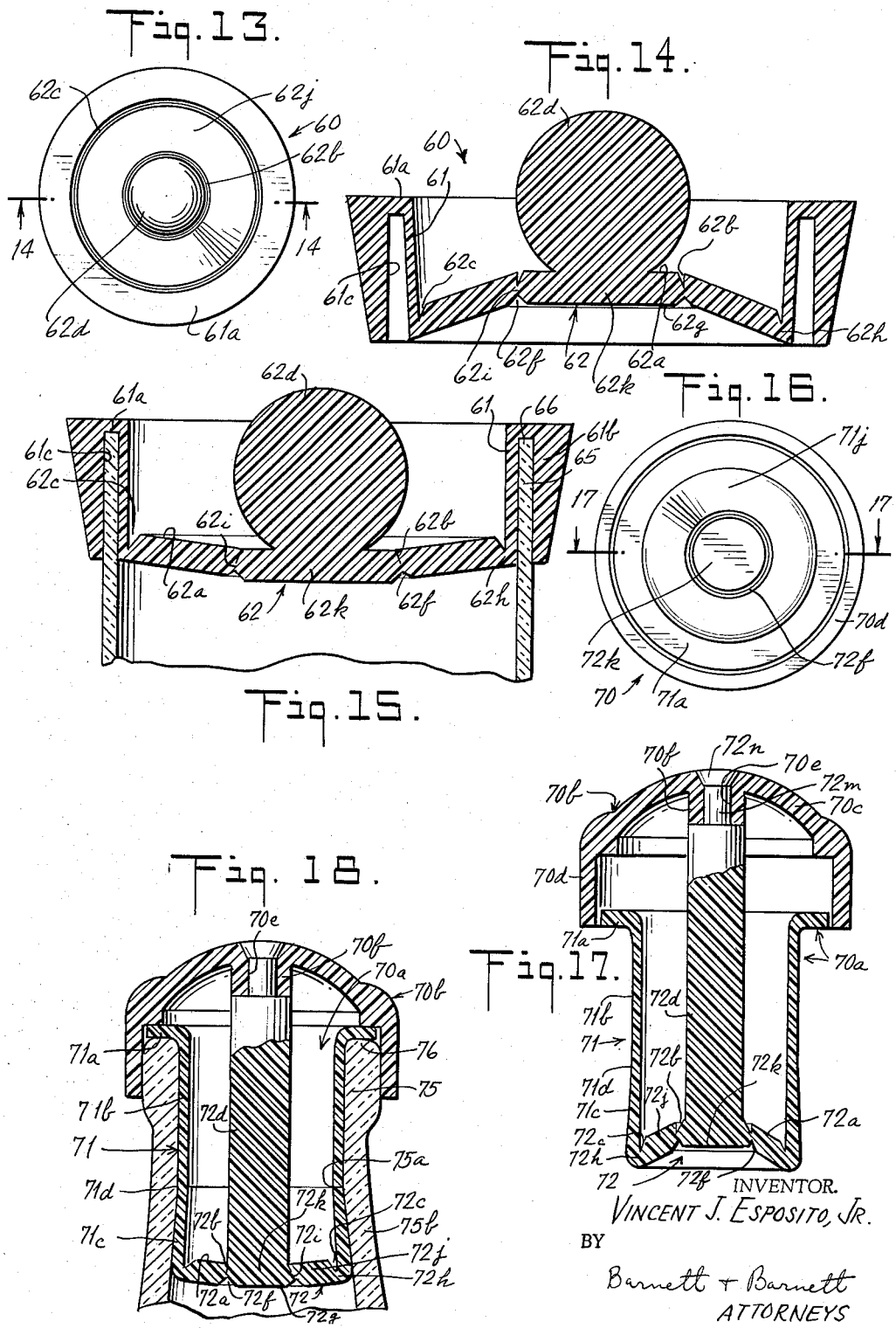

3,244,308
MOLDED BOTTLE CAPS WITH INTEGRAL PRESSURE ACTUATED SEALING MEANS
Vincent J. Esposito, Jr., Wayne, N.J., assignor to Fore Company, Inc., Wayne, N.J., a corporation of New Jersey
Filed Nov. 18, 1963, Ser. No. 324,387
14 Claims. (Cl. 215—52)

This invention relates to closures for bottles and the like containers and more particularly is directed to caps, corks or stoppers molded of elastomeric plastic resinous material having integral means for selectively applying radial pressures to engage the mouth or neck of such containers for sealing and resealing thereof.

Among the objects of the invention is to generally improve caps of the character described which may be molded as a single, unitary integral structure of elastomeric material in various sizes and shapes for use on bottles of glass or plastic for milk, soda and other beverages, wide mouth jars and like containers for foods, cleaners, detergents, cosmetics and other household commodities, or molded in a plurality of parts for assembly into caps of more expensive design for use in carbonated wine bottles, which shall be economical to manufacture in quantity production by modern molding methods, which shall provide a resilient wall and an annular skirt integrally formed about the periphery of the wall, which caps shall be formed in a novel manner to permit deflection of the wall from a normal convex position for easy insertion and removal of the cap from the bottle, jar or like container to a concave position by the application of finger pressure to expand the skirt against the interior of the bottle, jar or container mouth or neck for sealing and resealing the container by grip-locking the cap therein and to permit release of the grip-locking by a finger pulling force to return the wall to the normal convex poition, which shall be capable of compensating for conventional variations in glass bottle mouth and neck sizes, which shall be foolproof in operation, corrosion resistant and sanitary for use on food containers, practical and efficient to a high degree in use.

Other objects of the invention will in part be obvious and in part hereinafter pointed out.

The invention accordingly consists of features of construction, combinations of elements and arrangements of parts which will be exemplified in the constructions hereinafter disclosed, the scope of the application of which will be indicated in the claims following.

In the accompanying drawings in which various embodiments of the invention are shown:

FIG. 1 is a top plan view of a bottle cap constructed to embody the invention shown in a normal released position.

FIG. 2 is an enlarged vertical sectional view taken on line 2—2 in FIG. 1 showing details of construction.

FIG. 3 is a vertical sectional view similar to FIG. 2 but showing the cap mounted in sealed position on the mouth of a bottle, that is, with the wall in a depressed concave position expanding the skirt to grip-lock the interior wall of the bottle neck. The space appearing between the upper portion of the skirt and the bottle neck is an exaggeration for the purpose of illustrating the lateral pressure exerted upon the bottom of the skirt by the diaphragm action of the transverse wall.

FIG. 4 is a top plan view of a modified form of bottle cap having an eccentrically positioned finger release tab.

FIG. 5 is an enlarged vertical sectional view taken on line 5—5 in FIG. 4.

FIG. 6 is a vertical sectional view similar to FIG. 5 but showing the cap mounted in sealed position on the mouth of a glass milk bottle, an annular section of the transverse wall being slightly bowed in section to illustrate the manner in which the bottle cap, made to relatively close tolerances, compensates for the conventional relatively wide tolerances of glass bottle necks, the condition illustrated being that of a bottle neck at the small end of the tolerance range.

FIG. 7 is a top plan view of another modified form of bottle cap for use on small mouth soda-type bottles.

FIG. 8 is an enlarged vertical sectional view taken on line 8—8 in FIG. 7.

FIG. 9 is a vertical sectional view similar to FIG. 8 but showing the cap mounted in sealed position on the mouth of a soda-type bottle.

FIG. 10 is a top plan view of still another modified form of bottle cap for use on containers of the blown plastic type.

FIG. 11 is an enlarged sectional view taken on line 11—11 in FIG. 10.

FIG. 12 is a vertical sectional view similar to FIG. 11 but showing the cap mounted in sealed position on the mouth of a blown plastic type container having an undercut inwardly of the mouth.

FIG. 13 is a top plan view of still another modified form of cap for use on cosmetic jars and the like.

FIG. 14 is an enlarged sectional view taken on line 14—14 in FIG. 13 showing the double-walled skirt construction.

FIG. 15 is a vertical sectional view similar to FIG. 14 but showing the cap mounted in sealed position on the mouth of a cosmetic jar.

FIG. 16 is a bottom view of still another modified form of cap for use on carbonated wine bottles.

FIG. 17 is a vertical sectional view taken on line 17—17 in FIG. 16 showing details of the two piece construction, and FIG. 18 is a vertical sectional view similar to FIG. 17 but showing the cap mounted in sealed position on the mouth of a carbonated wine bottle.

Referring in detail to FIGS. 1, 2 and 3 of the drawings, 20 generally denotes a bottle cap of the stopper type, that is, a cap designed to fit into and engage the interior of a bottle neck 25. Cap 20 may be molded as an integral unit of a suitable material having elastomeric properties, such as, rubber, polyolefins, polyvinyls, polyurethanes and the like, to comprise an annular or tubular skirt 21 sized to snugly but easily fit into bottle neck 25 and a transverse wall 22 serving as a bottle neck closure terminating the lower end of skirt 21. The upper end of skirt 21 may be formed with a radial flange 21a for abutting bottle mouth 26 to limit the movement of cap 20 into bottle neck 25.

To provide for sealing, releasing and resealing of bottle neck 25 by cap 20, transverse wall 22 is molded in a convex configuration with respect to upfacing or exterior surface 22a in which a concentric groove 22b is formed spaced between a peripheral groove 22c and a central integral upstanding pull tab 22d which may be suitably sized and shaped, here shown as a hollow cylindrical structure. An auxiliary groove 22e may also be provided at the base of pull tab 22d and a complementary groove 22f is formed in the downfacing or interior surface 22g of wall 22 in register with groove 22b for the purpose hereinafter more fully described.

Peripheral groove 22c may be formed in any suitable configuration and to a depth to provide a relatively thin walled flexible interconnecting web 22h between transverse wall 22 and skirt 21. Concentric groove 22b and complementary groove 22f combine to provide a flexible web 22i between an outer annular area 22j and an inner circular area 22k which includes pull tab 22d.

As seen in FIG. 2, when transverse wall 22 is in a normal convex, that is "released," position with skirt 21 slightly tapering downwardly, annular area 22j slopes upwardly at a predetermined angle $\alpha$ with respect to the transverse plane $x$—$x$. In the grip-locking position shown in FIG. 3 transverse wall 22 is only slightly concave so that annular area 22j slopes downwardly on the opposite side of transverse plane $x$—$x$ at a predetermined angle $\alpha_1$. In the concave position transverse wall 22 expands skirt 21 laterally to apply a pressure against the interior of bottle neck 25.

In order to retain skirt 21 in the expanded position shown in FIG. 3, it will be apparent that means must be incorporated in transverse wall 22 to limit angle $\alpha_1$ to less than angle $\alpha$. To this end, concentric groove 22b may be provided with side walls upwardly diverging at a predetermined angle $\beta$ which is greater than angle $\alpha$ to permit wall 22 to flex from the convex to the concave position but substantially less than twice angle $\alpha$ to limit angle $\alpha_1$ to less than angle $\alpha$.

A feature of the invention is the diaphragm action of transverse wall 22 and particularly its ability to lock in the concave position shown in FIG. 3. Web 22j formed by concentric groove 22b and complementary groove 22f sectionalizes transverse wall 22 into outer annular area 22j and inner circular area 22k for separate and independent action hereinafter more fully described. Auxiliary groove 22e is optional and may be omitted in which case inner circular area 22k will retain the slight convex configuration shown in FIG. 2 when tab 22d is depressed into the grip-locking position of FIG. 3.

The operation of resealable bottle cap 20 will now be apparent. Cap 20, molded as a one piece integral structure with transverse wall 22 in the convex position shown in FIG. 2, is initially seated as a stopper in neck 25 with flange 21a engaging mouth 26 of a filled bottle or container. The contents is then sealed therein by depressing tab 22d to deform transverse wall 22 to the concave position shown in FIG. 3, thereby spreading skirt 21 and exerting radial pressure for grip-locking neck 25. In this condition the filled and sealed bottle may be shipped and stored, the sealed cap 20 being capable of withstanding rough handling and abuse to the same degree as the container itself. Any internal pressure exerted against sealed cap 20, as for example when the container is turned upside down, will be distributed evenly upon the area of transverse wall 22 and serve to tighten the gripping action rather than spring the wall into the convex released position. In this regard the properties of the elastomeric material and the thickness of transverse wall 22 is chosen to provide the latter with the proper balance between stiffness and resiliency to obtain the desired results. A specific example is hereinafter described in reference to the milk bottle cap 30 shown in FIGS. 4, 5 and 6.

Elastomeric molding material, such as the polyolefins, have been found to possess a "memory" whereby a diaphragm molded in a convex configuration similar to transverse wall 22, upon being distorted to a concave configuration, would in time and with or without slight urging return to its original convex configuration. Concentric groove 22b and complementary groove 22f coact to provide by means of flexible web 22i for said separate and independent action between outer annular area 22j and inner circular area 22k and to overcome this "memory" while retaining sufficient resiliency for performing the grip-locking action when in the concave configuration.

The bottle is opened by gripping same in one hand, the upper end of pull tab 22d of sealed cap 20 in the other hand and first tilting pull tab 22d as indicated by the arrow and the broken lines in FIG. 3. This facilitates release of the transverse wall 22 from the concave position for return to its normal convex position by the exertion of further upward force on pull tab 22d. When in normal released convex position, cap 20 is readily removed from neck 25. To reseal the bottle, cap 20 is merely replaced in neck 25 and pull tab 22d depressed to again spring transverse wall to its concave position. Sealing, removal and resealing of any one cap 20 may be performed as many times as desired without impairing its useful life.

FIGS. 4, 5 and 6 show a slightly modified cap 30 embodying the invention proportioned to fit the mouth 36 and neck 35 of a conventional glass milk bottle formed with an interior shoulder 35a against which cap 30 abuts. The latter is molded of an elastomeric material as an integral unit comprising elements similar to cap 20, namely, a tubular skirt 31 having a flange 31a shaped to substantially conform to the bottle mouth 36 and a transverse wall 32 molded in a convex configuration with respect to upfacing or exterior surface 32a in which concentric groove 32b and peripheral groove 32c are formed, the latter providing flexible web 32h interconnecting skirt 31 and wall 32. Complementary groove 32f is formed in downfacing or interior surface 32g in register with groove 32b, the latter and complementary groove 32f, combining to provide flexible web 32i between outer annular area 32j and circular central area 32k. A suitable pull tab structure may be provided for cap 30, such as a projection from area 32k in the manner shown for cap 20, or a pull tab 32d seen in FIGS. 4, 5 and 6 as a flat plate upstanding from outer annular area 32j and extending radially from concentric groove 32b.

As a specific example of one embodiment of the invention, bottle cap 30 molded of a .924 density polyethylene and sized to fit bottle neck 35 of 1⅝ inch internal diameter renders satisfactory results with transverse wall 32 and particularly annular area 32j proportioned to a thickness of .090 to .100 inch and concentric groove 32b and complementary groove 32f cut to a depth to provide flexible web 32i of approximately one third of said wall thickness. Circular central area 32k may be equal to or greater than annular area 32j in thickness.

Inasmuch as caps of polyolefins or similar material are conveniently molded to tolerances of about .002 inch while glass bottles may vary as much as .030, cap 30 may be made to compensate for such differences by molding the latter to properly fit the largest diameter bottle neck so that when cap 30 is applied by chance to the smallest diameter bottle neck within the .030 range, outer annular area 32j will bow slightly across the radius as shown in FIG. 6.

To remove cap 30 from the milk bottle, pull tab 32d may be tilted radially as indicated by the arrow and the broken lines in FIG. 6, which tilting serves to raise circular central area 32k and breaks the lock of transverse wall 32 in its concave position. The broken line positions of tabs 22d and 32d in FIGS. 3 and 6, respectively, are not intended to illustrate the extent of tilting required to free transverse walls 22 and 32 from their concave positions, but merely supplement the arrows in showing the direction of movement.

As another modified form of bottle cap designed for soda-type bottles having a relatively small diameter mouth 46, a substantially cylindrical neck 45 merging at edge 45a with an upwardly tapering wall 45b of the bottle, cap 40 is shown in FIGS. 7, 8 and 9 to comprise a tubular skirt 41 having a flange 41a shaped to substantially conform to bottle mouth 46 and a transverse wall 42 molded in a convex configuration similar to walls 22 and 32 of caps 20 and 30 respectively. Skirt 41 is proportionally deeper than skirts 21 or 31 to include an upper section 41b sized to conform to cylindrical bottle neck 45 and a lower section 41c merging therewith at bight 41d into a downwardly broadening contour or reverse taper to conform to and grip-lock upwardly tapering bottle wall 45b when transverse wall 42 is in the depressed concave position shown in FIG. 9.

Transverse wall 42 also has a peripheral groove 42c and a concentric groove 42b formed in upfacing or exterior surface 42a, peripheral groove 42c providing flexible web 42h interconnecting lower skirt section 41c with transverse wall 42. Complementary groove 42f is likewise formed in downfacing or interior surface 42g in register with groove 42b, the latter and complementary groove 42f providing flexible web 42i between outer annular area 42j and circular central area 42k. Pull tab 42d is shown as a cylindrical projection from circular central area 42k.

FIGS. 10, 11 and 12 illustrate another modified cap 50 constructed to embody the invention designed for a bottle made of plastic material having a neck 55 formed with an undercut groove 55a spaced from mouth 56. Cap 50 is substantially similar to caps 20 and 30, having skirt 51, flange 51a, transverse wall 52, exterior surface 52a formed with concentric groove 52b and peripheral groove 52c, flexible web 52h, complementary groove 52f in interior surface 52g, flexible web 52i between outer annular area 52j and circular central area 52k. Any suitable pull tab structure may also be utilized, here shown as pull tab 52d having a cross-shaped configuration. As is clear from FIG. 12, skirt 51 is formed with a bead 51b located at the bottom edge thereof, skirt 51 being sized to fit neck 55 so that flange 51a abuts mouth 56 and bead 51b engages undercut groove 55a when transverse wall 52 is depressed into concave grip-locking position.

A more decorative closure or cap 60 is shown in FIGS. 13, 14 and 15 for use on cosmetic containers or jars made of glass, plastic or metal each having a mouth 66 and a neck 65 which may or may not be of reduced diameter with respect to the container portion thereof. Cap 60 has a double walled skirt comprising an inner skirt 61 corresponding substantially to skirts 21 and 31 of caps 20 and 30, respectively, a flange portion 61a for radially extending across container mouth 66 and integrally connecting an outer skirt 61b spaced from inner skirt 61 to provide an annular seat 61c for receiving container neck 65. In a manner similar to caps 20, 30, 40 and 50, transverse wall 62 is formed with an exterior surface 62a having concentric groove 62b and peripheral groove 62c providing flexible web 62h between wall 62 and skirt 61, the interior surface 62g having complementary groove 62f forming flexible web 62i between outer annular area 62j and circular central area 62k. Pull tab 62d may also be given a more decorative appearance, such as the spherical shape shown.

A champagne cork embodying the invention is shown in FIGS. 16, 17 and 18 as cap 70 which may be molded in two separate parts, namely, a cork or stopper portion 70a and an exterior cover portion 70b and assembled into a unitary structure. A champagne bottle for receiving cap 70 is shown in FIG. 18 to have a mouth 76 and a substantially cylindrical neck 75 merging at an edge 75a with an upwardly tapering wall 75b. Cork portion 70a is similar to cap 40, having a flange 71a radially extending from skirt 71, which is formed with an upper section 71b and a reverse tapering lower section 71c merging therewith at bight 71d. Skirt 71 is proportioned for registry of bight 71d with edge 75a when flange 71a abuts mouth 76, lower skirt section 71c being spread to grip-lock against tapering bottle wall 75b when transverse wall 72 is depressed.

Transverse wall 72 of cork portion 70a is likewise similar to wall 42, having a peripheral groove 72c and a concentric groove 72b formed in upfacing surface 72a, a flexible web 72h interconnecting lower skirt section 71c with transverse wall 72, a complementary groove 72f in downfacing or interior surface 72g and a flexible web 72i between outer annular area 72j and circular central area 72k. The pull tab structure is modified to provide an elongated push rod 72d integrally formed to extend upwardly and axially from central area 72k and terminating in suitable means for engaging cover portion 70b, such as, a reduced diameter end 72m.

Cover portion 70b may be suitably shaped to resemble the head of a champagne cork, having a top wall 70c and a peripheral side wall 70d sized to snugly fit over the exterior of the bottle mouth 76. Top wall 70c has an axial opening 70e which may be reenforced with an interior flange 70f.

As will be clear from FIGS. 17 and 18, cork portion 70a may be assembled with cover portion 70b by positioning reduced diameter end 72m in opening 70e and suitably retaining the parts as by cementing, or as shown, by heating swaging or spreading the tip 72n of end 72m.

In operation, cap 70 is inserted into the neck of a bottle with transverse wall 72 in convex position so that cover portion 70b is spaced from flange 71a. By depressing cover portion 70b to abut flange 71a and fit over the exterior of the bottle mouth 76, push rod 72d deflects transverse wall 72 to its concave position, grip-locking lower skirt section 71c against wall 75b. Cover portion 70b may be wired in this closed position in the conventional manner for carbonated wines. Upon removal of the wire, cover portion 70b is raised to release and remove cap 70, which may be reused by resealing in the manner above described.

Bottle or container caps 30, 40, 50, 60 and 70 all operate in a manner similar to cap 20 as hereinbefore described and are provided with comparable angles $\alpha$, $\beta$ and $\alpha_1$, it being understood that the actual values of these angles may vary depending upon the diameter of the cap, the thickness of the walls and the stiffness and resiliency of the material but the size relationship of the angles as described will be maintained.

It is thus seen that there are provided molded resealable bottle caps with integral pressure actuated sealing means whereby the several objects of this invention are achieved and which are well adapted to meet the conditions of practical use.

As various possible embodiments might be made of the above invention, and as various changes might be made in the embodiments above set forth, it is to be understood that all matters herein set forth or shown in the accompanying drawing are to be interpreted as illustrative and not in a limiting sense.

Having thus described my invention, I claim as new and desire to secure by Letters Patent:

1. A resealable cap molded of elastomeric material comprising a skirt sized to fit in stopper fashion into a neck of an open mouthed container, a transverse wall integrally formed across a lower end of the skirt forming a closure for the container and a means for applying a radial force to spread the skirt for grip-locking against said container neck, said transverse wall being molded into a normally convex configuration and having a peripheral groove forming a flexible web between the skirt and transverse wall facilitating deflection of the latter on the application of finger pressure into a concave configuration applying said radial force to the skirt, said transverse wall being sectionalized into a circular central area interconnected by a second web to an outer annular area, said second web being relatively thin with respect to the thickness of said circular central and outer annular areas providing an annulus of flexure to effect a locking of said transverse wall in said concave configuration, means integrally formed in said transverse wall for predetermining the contour of said concave configuration to provide sufficient radial force for said grip-locking, and finger grip means projecting upwardly from said transverse wall for manipulating the latter to return to said convex configuration for release and removal of the cap from the container neck.

2. The resealable cap defined in claim 1 in which said second web is formed by a concentric groove in an upfacing surface of the transverse wall and a complementary groove formed in the opposite surface thereof, said concentric groove having opposite side edges adapted to close when said wall is deflected to the concave configuration serving as said contour predetermining means.

3. The resealable cap defined in claim 1 in which a radial flange is integrally formed at an upper end of said skirt to extend across the mouth of the container for limiting the depth of insertion of the cap into the bottle neck.

4. The resealable cap defined in claim 1 in which a radial flange extends from an upper end of said skirt interconnecting an outer skirt spaced from the latter to extend along the exterior surface of the container.

5. A resealable cap for a relatively narrow mouthed soda-type bottle having a neck formed with an upper cylindrical portion and an upwardly tapering lower portion merging therewith, said cap being molded of elastomeric material comprising a skirt sized to fit in stopper fashion into the bottle neck and proportioned to conform substantially to said upper and lower neck portions, a transverse wall integrally formed across a lower end of the skirt forming a closure for the bottle, said transverse wall being molded into a normally convex configuration and being deformable into a concave configuration for applying a radial force to spread the skirt for grip-locking against said lower neck portion by causing a reverse downward taper to a lower portion of said skirt, said transverse wall being sectionalized into a circular central area interconnected by a web to an outer annular area, said web being relatively thin with respect to the thickness of said circular central and outer annular areas providing an annulus of flexure to effect a locking of said transverse wall in said concave configuration, means integrally formed in said transverse wall for predetermining the contour of said concave configuration to provide sufficient radial force for said grip-locking, and finger grip means projecting upwardly from said central area for manipulating said transverse wall between said convex and concave configurations.

6. A resealable cap for an open mouthed container having a neck formed with an undercut groove spaced from the mouth thereof, said cap being molded of elastomeric material comprising a skirt sized to fit in stopper fashion into the container neck, said skirt having a radial flange formed at an upper end thereof and a bead spaced from said flange to register with the undercut groove when the flange rests on the container mouth, a transverse wall integrally formed with said skirt deformable from a normally convex configuration to a concave configuration for applying a radial force to spread the skirt and engage the bead in the undercut groove, said transverse wall being sectionalized into a circular central area interconnected by a web to an outer annular area, said web being relatively thin with respect to the thickness of said circular central and outer annular areas providing an annulus of flexure therebetween to effect a locking of said transverse wall in said concave configuration, and finger grip means projecting upwardly from said transverse wall for manipulating the latter to return to said convex configuration for release and removal of the cap from the container neck.

7. In combination with glass open mouthed bottles having necks of varying diameters to relatively wide tolerances, resealable caps molded of elastomeric material to relatively close tolerances, each cap comprising a skirt sized to fit in stopper fashion into said bottle neck, a transverse wall integrally formed across a lower end of the skirt forming a closure for the bottle, said transverse wall being molded into a normally convex configuration and being deformable into a concave configuration for applying a radial force to spread the skirt for grip-locking against said bottle neck, said transverse wall being sectionalized into a circular central area interconnected by a web to an outer annular area, said web being relatively thin with respect to the thickness of said circular central and outer annular areas providing an annulus of flexure to effect a locking of said transverse wall in said concave configuration, means integrally formed in said transverse wall for predetermining the contour of said concave configuration to provide sufficient radial force for said grip-locking, finger grip means projecting upwardly from said transverse wall for manipulating the latter to return to said convex configuration for release and removal of the cap from the bottle neck, said transverse wall being sized to snugly fit the relatively large diameter bottle necks of said wide tolerances with said outer annular area having a relatively flat cross-section, said outer annular area constructed and arranged to compensate by radial bowing for relatively smaller diameter bottle necks within said wide tolerances.

8. A resealable cap molded of elastomeric material comprising a tubular skirt sized to fit into a neck of an open mouth container, a transverse wall integrally formed across a lower end of said skirt deformable from a normally convex configuration to a concave configuration thereby applying a radial force to spread the skirt at said lower end for grip-locking against said neck of the container, said transverse wall being sectionalized into a circular central area interconnected by a web to an outer annular area, said web being relatively thin with respect to the thickness of said circular central and outer annular areas providing an annulus of flexure therebetween to effect a locking of said transverse wall in said concave configuration, and finger grip means projecting upwardly from said transverse wall for manipulating the latter to return to said convex configuration for release and removal of the cap from the container neck.

9. The resealable cap defined in claim 8 in which a peripheral groove is formed in said transverse wall providing a second flexible web, the latter interconnecting the skirt with said transverse wall to facilitate said deforming.

10. The resealable cap defined in claim 9 in which said first mentioned web provides a second groove formed in an upper surface of said transverse wall, said second groove being adapted to close when said wall is deformed to predetermine the contour of said concave configuration to insure said skirt spreading.

11. The resealable cap defined in claim 8 in which said finger grip means is integrally formed with said central area.

12. The resealable cap defined in claim 8 in which said finger grip means is integrally formed with said outer annular area.

13. A resealable cap for a carbonated wine type bottle havin a neck formed with an upper cylindrical portion and an upwardly tapering lower portion merging therewith, said cap being fashioned in two parts, the first part being a stopper portion molded of elastomeric material comprising a skirt sized to fit into the bottle neck and proportioned to conform substantially to said upper and lower neck portions, a transverse wall integrally formed to extend across a lower end of the skirt and having a normally convex configuration deformable into a concave configuration for applying a radial force to spread the skirt for grip-locking against said lower neck portion by causing a reverse downward taper to a lower portion of said skirt, said transverse wall being sectionalized into a circular central area interconnected by a web to an outer annular area, said web being relatively thin with respect to the thickness of said circular central and outer annular areas providing an annulus of flexure therebetween to effect a locking of said transverse wall in said concave configuration, a radial flange extending from an upper end of the skirt for engaging the bottle mouth to limit the movement of the stopper portion into the neck, manipulating means integrally formed with said central area extending upwardly from said transverse wall, the second part of said cap being a cover sized and shaped to extend across said flange, and means interconnecting said cover and manipulating means to space the cover above said radial flange when the transverse wall is in said convex configuration and to abut said flange when the cover is lowered to depress the transverse wall to said concave configuration through the manipulating means.

14. A cap molded of elastomeric material comprising a skirt sized to fit into a neck of an open mouth container, a transverse wall integrally formed across a lower end of said skirt forming a closure for the container and a means for applying a radial force to spread the skirt for griplocking against said container neck, said transverse wall being molded into a normally convex configuration and having a peripheral groove forming a flexible web between the skirt and transverse wall facilitating deflection of the latter on the application of pressure into a concave configuration applying said radial force to the skirt, said transverse wall being sectionalized into a circular central area interconnected by a second web to an outer annular area, said second web being relatively thin with respect to the thickness of said circular central and outer annulus areas providing an annulus of flexure to effect a locking of said transverse wall in said concave configuration, and means integrally formed in said transverse wall for predetermining the contour of said concave configuration to provide sufficient radial force for said grip-locking, said second web being formed by a concentric groove in an upfacing surface of the transverse wall and a complementary groove formed in the opposite surface thereof, said concentric groove having opposite side edges adapted to close when said wall is deflected to the concave configuration serving as said contour predetermining means.

References Cited by the Examiner

UNITED STATES PATENTS

| | | | |
|---|---|---|---|
| 1,022,060 | 4/1912 | Brown | 215—52 |
| 2,266,270 | 12/1941 | Roth. | |
| 2,487,635 | 11/1949 | Carpenter | 215—52 X |
| 3,080,993 | 3/1963 | Livingstone | 220—24.5 |

FOREIGN PATENTS

| | | |
|---|---|---|
| 1,252,996 | 12/1960 | France. |
| 704,190 | 2/1954 | Great Britain. |
| 153,832 | 3/1956 | Sweden. |

FRANKLIN T. GARRETT, *Primary Examiner.*

GEORGE O. RALSTON, *Examiner.*